US012244081B2

(12) United States Patent
Khatua et al.

(10) Patent No.: US 12,244,081 B2
(45) Date of Patent: Mar. 4, 2025

(54) SUBSTRATE INTEGRATED WAVEGUIDE CAVITY-BACKED DUAL-POLARIZED MULTI-BAND ANTENNA

(71) Applicant: QUALCOMM Incorporated, San Diego, CA (US)

(72) Inventors: Sanjaya Kumar Khatua, Hyderabad (IN); Sang-June Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/949,089

(22) Filed: Sep. 20, 2022

(65) Prior Publication Data

US 2024/0097339 A1 Mar. 21, 2024

(51) Int. Cl.
*H01Q 9/04* (2006.01)
*H01Q 1/24* (2006.01)
*H01Q 5/10* (2015.01)
*H01Q 13/18* (2006.01)

(52) U.S. Cl.
CPC ........... *H01Q 9/0485* (2013.01); *H01Q 1/243* (2013.01); *H01Q 13/18* (2013.01); *H01Q 5/10* (2015.01)

(58) Field of Classification Search
CPC .... H01Q 9/0485; H01Q 9/0407; H01Q 1/243; H01Q 1/38; H01Q 21/065; H01Q 21/24
See application file for complete search history.

(56) References Cited

U.S. PATENT DOCUMENTS 4,803,494 A * 2/1989 Norris .................... H01Q 21/24 343/746
2019/0020114 A1* 1/2019 Paulotto .................. H01Q 9/40
2021/0359424 A1* 11/2021 Hiramatsu ......... H01Q 21/0006

OTHER PUBLICATIONS

Author: Yan Yang, title A Low-Profile Dual-Circularly PolarizedWide-Axial-Ratio-Beamwidth Slot Patch AntennaWith Six-Port Feeding Network (Year: 2021).*
Mukherjee S., et al., “Design of Dual Band and Dual-Polarised Dual Band SIW Cavity Backed Bow-Tie Slot Antennas”, in IET Microwaves, Antennas Propagation, vol. 10, No. 9, pp. 1002-1009, Apr. 2016.
Zhang T., et al., “Design and Analysis of SIW Cavity Backed Dual-Band Antennas with a Dual-Mode Triangular-Ring Slot”, IEEE Transactions on Antennas and Propagation, vol. 62, No. 10, pp. 1-10, Oct. 2014.

(Continued)

*Primary Examiner* — Wei (Victor) Y Chan
(74) *Attorney, Agent, or Firm* — Haynes and Boone, LLP/Qualcomm Incorporated

(57) ABSTRACT

An antenna is provided that includes a dielectric-filled cavity having a bottom surface, a top surface, and a rectangular perimeter. A round metal layer faces the bottom surface whereas a resonator metal layer faces the top surface. A plurality of metallic vias is arranged about the rectangular perimeter to couple a perimeter of resonator layer to the ground layer. An opening divides the resonator layer into a first pair of resonators and into a second pair of resonators. Within each pair of resonators, one resonator is configured for operation according to a first linear polarization whereas a second resonator is configured for operation according to a second linear polarization that is orthogonal to the first linear polarization.

11 Claims, 9 Drawing Sheets

(56) References Cited

OTHER PUBLICATIONS

Almalki H.M., et al., "Design of Dual-Band, 4-Ports MIMO Antenna-Diplexer Based on Quarter-Mode Substrate Integrated Waveguide", International Journal of Antennas and Propagation, vol. 2022, Sep. 23, 2022, pp. 1-9, XP093102090, section 2, p. 2-p. 6, figure 1.
International Search Report and Written Opinion—PCT/US2023/031318—ISA/EPO—Jan. 3, 2024.
Singh A.K., et al., "Compact Self-Quadruplexing Antenna Based on SIW Cavity-backed with Enhanced Isolation", Progress in Electromagnetics Research C, vol. 110, Mar. 9, 2021, pp. 243-252, XP093101547, Section 2, p. 243-p. 247, Figures 1, 2(a), table 1.
Yan Y-D., et al., "A Low-Profile Dual-Circularly Polarized Wide-Axial-Ratio-Beamwidth Slot Patch Antenna With Six-Port Feeding Network", IEEE Antennas and Wireless Propagation Letters, IEEE, Piscataway, NJ, US, vol. 20, No. 12, Sep. 28, 2021, pp. 2486-2490, XP011894956, Sections I.-II.B, p. 2486-p. 2487, Figures 1-3.

* cited by examiner

SUBSTRATE INTEGRATED WAVEGUIDE CAVITY-BACKED DUAL-POLARIZED MULTI-BAND ANTENNA

FIELD OF TECHNOLOGY

The present disclosure relates generally to antennas, and more particularly to a substrate integrated waveguide (SIW) cavity-backed dual-polarized multi-band antenna.

BACKGROUND

For wireless systems employed in millimeter wavelength (mmW) spectrums (e.g., 24 GHz to 40 GHz for Fifth Generation New Radio (5G NR), also referred to as FR2, or higher frequencies), it is desirable to include a multi-band antenna or antenna array in a single device to increase transmission and reception capabilities of the device. Millimeter wave antennas may be patch antennas. To provide coverage over multiple frequency bands, the patch antennas may be multi-layer patch antennas. But patch antenna radiation is based upon a fringing field such that conventional multi-layer patch antennas often suffer from lowered gain and radiation efficiency when placed into a mobile device. In addition, cross-polarization fidelity of patch antennas degrades at millimeter wave frequencies.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, an antenna for wireless communication is provided that includes: a dielectric-filled cavity having a bottom surface, a top surface, and a rectangular perimeter; a first ground metal layer adjacent the bottom surface; a resonator metal layer adjacent the top surface; a plurality of metallic vias disposed along the rectangular perimeter and coupled to the first ground metal layer and to the resonator layer; and an opening configured to divide the resonator metal layer into a first triangular resonator having a first side aligned with a first side of the rectangular perimeter and into a second triangular resonator having a first side aligned with a second side of the rectangular perimeter.

In accordance with another aspect of the disclosure, an antenna structure is provided that includes: a dielectric-filled cavity having a bottom surface, a top surface, and a rectangular perimeter; a ground metal layer adjacent the bottom surface; a resonator metal layer adjacent the top surface; a plurality of metallic vias disposed along the rectangular perimeter and coupled to the ground metal layer and to the resonator layer; and an opening in the ground metal layer configured to divide the resonator metal layer into a first rectangular resonator having a first corner aligned with a first corner of the rectangular perimeter and into a second rectangular resonator having a second corner aligned with a second side of the rectangular perimeter.

In accordance with yet another aspect of the disclosure, an apparatus for wireless communication is provided that includes: a substrate integrated waveguide (SIW) cavity; first, second, third, and fourth metal resonators disposed on a top surface of the SIW cavity, wherein the first and second metal resonators are operable to radiate at a first millimeter wave frequency and the third and fourth metal resonators are operable to radiate at a second millimeter wave frequency that is higher than the first millimeter wave frequency; a ground layer disposed on a bottom surface of the SIW cavity; a substrate coupled to a bottom surface of the ground layer; and a conductive lead disposed between the ground layer and the substrate, wherein the conductive lead is operable to feed electromagnetic (EM) energy into the SIW cavity through an opening in the ground layer.

Finally, in accordance with another aspect of the disclosure, a mobile wireless device is provided that includes: an external housing having a rectangular front face, an opposing rectangular back face, and four edges; a substrate supporting an antenna and having a top surface facing one of the four edges of the external housing, wherein the antenna includes: a dielectric-filled cavity; a ground metal layer adjacent a lower surface of the dielectric-filled cavity; a resonator metal layer adjacent an upper surface of the dielectric-filled cavity, and a plurality of metallic vias arranged around a rectangular perimeter of the dielectric-filled cavity, wherein the resonator metal layer is divided by an opening into a pair of triangular resonators of a first size and into a pair of second triangular resonators of a second size that is smaller than the first size.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1:
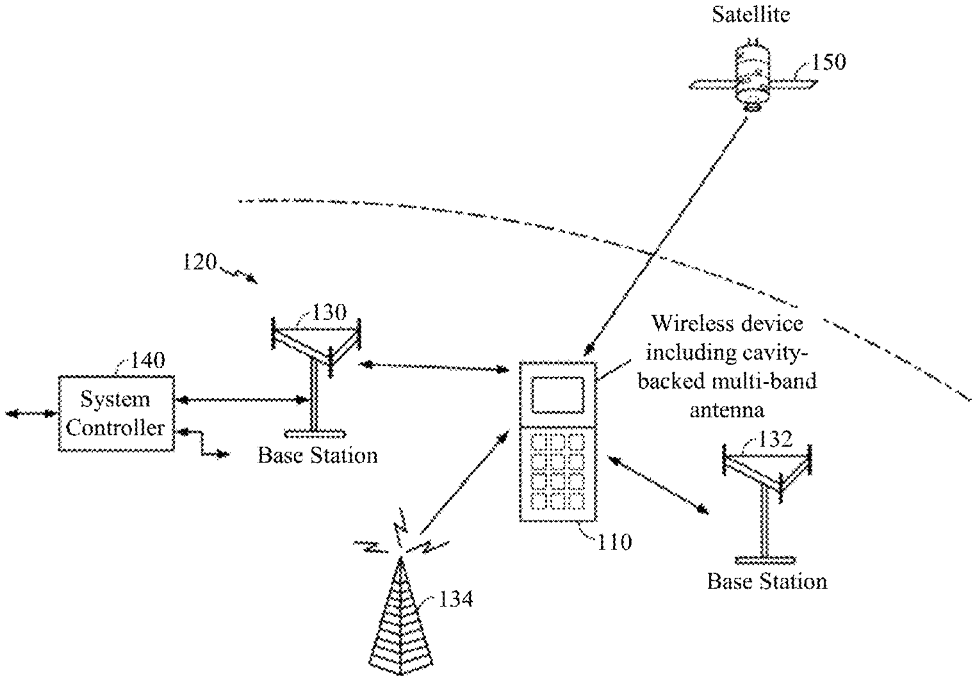
FIG. 1 illustrates an example of a system for wireless communication in which a wireless device includes a dual-band antenna assembly or structure in accordance with an aspect of the disclosure.

Dual-polarized radiation from patch antennas may be implemented with a pair of patch elements. For example, one patch is used for vertically polarized transmission or reception and another for horizontally polarized transmission or reception. To form the two patches, a manufacturer may pattern a first metal layer adjacent a substrate (the substrate may be a semiconductor substrate or a circuit board substrate). But at least one additional metal layer is typically used as a ground plane that intervenes between the first metal layer and the substrate. The patch size determines the frequency band that is addressed. A single-band dual-polarized patch antenna system may thus include two metal layers. Should dual-band coverage be desired, another metal layer may be patterned to form another pair of patches having a size configured for the additional frequency band. The resulting dual-band dual-polarized antenna structure then includes at least three metal layers, which increases manufacturing complexity and cost.

To provide a dual-band dual-polarized antenna structure using just two (or more) metal layers, a substrate integrated waveguide (SIW) cavity is provided with a plurality of resonators defined by an opening in a metallic resonator layer of the cavity. The term "cavity" is used although it is not empty but instead is filled with a dielectric. The cavity is thus also denoted herein as a dielectric-filled cavity. Two resonators are sized for a first frequency band whereas a remaining pair of the resonators are sized for a second frequency band. Within each pair of resonators, one resonator is oriented for a first linear polarization (e.g., vertical polarization) whereas a second resonator is oriented for a second linear polarization (e.g., horizontal polarization). The cavity is formed by a combination of a metallic ground layer, a metallic resonator layer, and a metallic via wall that couples a perimeter of the ground layer to a perimeter of the metallic resonator layer. Although alternative implementations may include an additional metal layer that intervenes between the first metal layer and the second metal layer, the resulting antenna structure may thus require just two metal layers so as to advantageously lower manufacturing complexity and cost.

In addition to using as few as two metal layers, the ground layer is coupled to the metallic via wall as each via connects between the two metal layers. The metallic via wall is thus grounded. Since the metallic via wall couples to a perimeter of the resonator layer, the perimeter of the resonator layer is also grounded. The perimeter is rectangular such that the cavity has four side walls. The resonator layer forms a top wall of the cavity whereas the ground layer forms a bottom wall. Of the six sides to the cavity, five are thus grounded. Similarly, the resonator layer is grounded on its perimeter. This extensive grounding of the cavity is quite advantageous in reducing interaction with a user should the antenna system be incorporated into a mobile wireless device such as a cellular telephone. In addition, the resulting antenna system may have reduced fringing as compared to a patch antenna alternative.

The following discussion will be directed to implementations in which the opening in the resonator layer subdivides the resonator layer into a lower-frequency pair of resonators and a higher-frequency pair of resonators. However, in alternative implementations, the opening may define a single pair of resonators. The resonators within each pair of resonators may be the same size. The perimeter of the dielectric-filled cavity is rectangular and thus has four orthogonal sides or edges. Given this rectangular shape of the perimeter, the four orthogonal sides may be divided into a pair of X-axis sides that are parallel with an X axis in a Cartesian coordinate system and a pair of Y-axis sides that a parallel with the Y axis. It will be seen in the following discussion that the orthogonality of the X axis sides to the Y axis sides leads to a dual-polarized radiation for both pairs of resonators. In a first implementation, the opening divides the resonator layer into a pair of high-frequency right triangular resonators and a pair of low-frequency right triangular resonators. Each right triangular resonator has a hypotenuse that aligns with a respective side of the rectangular perimeter of the cavity.

A first one of the high-frequency right triangular resonators has its hypotenuse aligned with a first X-axis side of the perimeter. Similarly, a remaining second one of the high-frequency right triangular resonators has its hypotenuse aligned with a first Y-axis side of the perimeter. The following discussion will assume that the rectangular perimeter is a square perimeter (e.g., 4 mm by 4 mm) for right-triangular-shaped resonators because this symmetry between the X-axis and Y-axis sides leads to an advantageous symmetry for each resonator pair. The resulting symmetrical but orthogonal relationship between the high-frequency right triangular resonators results in one transmitting and receiving according to a first linear polarization and the other transmitting and receiving according to a second linear polarization that is orthogonal to the first linear polarization.

The low-frequency right triangular pair of resonators are aligned analogously such that one has its hypotenuse aligned with a second X-axis side of the perimeter whereas the other has its hypotenuse aligned with a second Y-axis side of the perimeter. The symmetrical but orthogonal arrangement of the low-frequency resonators with respect to a center of the resonator layer results in one of the low-frequency resonators transmitting and receiving according to the first linear polarization and a remaining second one of the low-frequency resonators transmitting and receiving according to the second linear polarization that is orthogonal to the first linear polarization. The resulting alignment of the four right triangular resonators with the four sides of the square perimeter causes the opening to be X-shaped. In that regard, the perimeter has four corners. One arm of the X-shaped opening extends from a first corner to a diagonally opposing second corner of the perimeter. Similarly, a remaining arm of the X-shaped opening extends from a third corner of the perimeter to a diagonally opposing fourth corner of the perimeter.

As an alternative to the use of an X-shaped opening having arms that extend from opposing corners of the perimeter, the opening may be cross-shaped resulting in a first arm of the opening that extends from a midpoint of a first X-axis side of the perimeter to a midpoint of a remaining second X-axis side of the perimeter. A second arm of the cross-shaped opening extends from a point on a first Y-axis side of the perimeter to a point on the remaining Y-axis side of the perimeter. The cross-shaped opening is thus arranged to divide the resonator layer into a pair of high-frequency rectangular resonators and a pair of low-frequency rectangular resonators. Each rectangular resonator has a corner that is aligned with a corresponding corner of the perimeter. For example, one rectangular resonator in the low-frequency pair has a corner aligned with a first corner of the perimeter whereas the remaining rectangular resonator in the low-frequency pair has a corner aligned with a second corner of the perimeter that is adjacent the first corner. Similarly, one resonator in the high-frequency pair has a corner aligned with a third corner of the perimeter whereas the remaining resonator has a corner aligned with a fourth corner of the perimeter that is adjacent the third corner. The resulting symmetrical but orthogonal relationship between the resonators in each resonator pair supports the dual-polarized operation.

Regardless of the shape of the opening in the resonator layer, each resonator within a resonator pair is arranged orthogonally to each other with respect to a center of the resonator layer. The resulting symmetry ensures that the cavity can be excited in a transverse electric 101 (TE 101) mode. In this fashion, a first resonator in each resonator pair resonates at a first linear polarization whereas a second resonator in each resonator pair resonates at a second linear polarization that is orthogonal to the first polarization (e.g., one resonator being aligned for horizontal polarization and the other for vertical polarization).

Should the resonators be right triangular resonators, a first resonator in each resonator pair has its hypotenuse aligned with a first side or edge of the cavity perimeter. A remaining second resonator in the resonator pair has its hypotenuse aligned with a second side or edge of the perimeter that is adjacent to (and thus orthogonal to) the first side of the perimeter. Conversely, if the resonators are rectangular, the first resonator in each resonator pair has a corner aligned with a first corner of the cavity perimeter whereas the remaining second resonator has a corner aligned with a second corner of the perimeter that is adjacent to the first corner. Before discussing the antenna structure in more detail, some example wireless systems that may incorporate the antenna structure will be discussed.

Example Wireless Systems

FIG. 1 shows a wireless device 110 configured with an antenna structure as disclosed herein that is communicating within a wireless system 120. The wireless system 120 may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). These systems may also operate in accordance with one or more Institute of Electrical and Electronics Engineers (IEEE) protocols or standards (e.g., IEEE 802.11 ad), a millimeter wave wireless system, or some other wireless system. For simplicity, FIG. 1 shows wireless communication system 120 including two base stations 130 and 132 and one system controller 140. In general, a wireless system may include any number of base stations and any set of network entities.

The wireless device 110 may also be referred to as user equipment (UE), a mobile station, a mobile wireless device, a terminal, an access terminal, a subscriber unit, a station, etc. The wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, a device in communication with other devices in an Internet of Things (IoT) system, an automobile or component therein, a medical device, etc. The wireless device 110 may also receive signals from broadcast stations (e.g., a broadcast station 134) or signals from satellites (e.g., a satellite 150) in one or more global navigation satellite systems. The wireless device 110 may support one or more radio technologies for wireless communication such as LTE, WCDMA, CDMA 1×, EVDO, TD-SCDMA, GSM, IEEE 802.11ad, wireless gigabit, 5G high band communication, and mmW communication (which may include 60 GHz frequency band communication or higher frequencies). While portions of this description relate to the wireless device 110 being configured with an antenna structure as disclosed herein, any of the devices illustrated in FIG. 1 may be configured with any of the antenna structures as disclosed herein.

Figure 2:
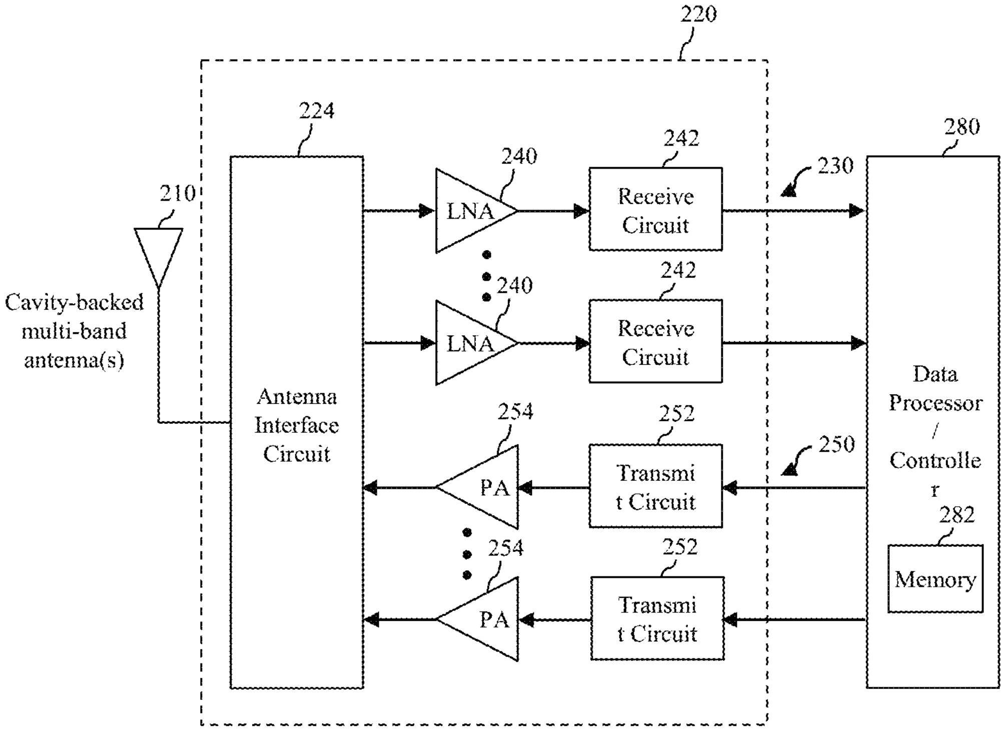
FIG. 2 is a diagram of components in the example wireless device of FIG. 1 in accordance with an aspect of the disclosure.

FIG. 2 shows a block diagram of the wireless device 110. In this exemplary design, the wireless device 110 includes a transceiver 220 coupled to one or more dual-band SIW cavity-backed antennas 210, and a data processor/controller 280. The transceiver 220 includes a receiver 230 and a transmitter 250.

In the example of FIG. 2, each frequency band processed by receiver 230 includes an LNA 240 and a receive circuit 242. Each resonator (not illustrated) in dual-band antenna 210 outputs a received radio frequency (RF) signal, which is routed through an antenna interface circuit 224 and presented as an input RF signal to the appropriate LNA 240. One LNA 240 may thus amplify an input RF signal of a first frequency band of the dual-band coverage whereas the remaining LNA 240 may amplify an input RF signal of a second frequency band of the dual-band coverage. The antenna interface circuit 224 may include components such as switches, duplexers, transmit filters, receive filters, and matching circuits. Each LNA 240 amplifies its input RF signal and provides an output RF signal. Each receive circuit 242 may down convert the corresponding output RF signal from RF to baseband, amplify, and filter the down converted signal to form a baseband input signal to the data processor/controller 280. Each receive circuit 242 may include components such as mixers, filters, amplifiers, matching circuits, an oscillator, a local oscillator (LO) generator, a phase locked loop (PLL), and analog to digital conversion circuitry.

The transmitter 250 may include a power amplifier (PA) 254 and transmit circuit 252 for each frequency band. For data transmission, the data processor/controller 280 processes (e.g., encodes and modulates) data to be transmitted and provides a baseband output signal to a selected transmit circuit. Each transmit circuit 252 may function to amplify, filter, and upconvert the baseband output signal from baseband to RF to form an output RF signal. To perform these functions, each transmit circuit 252 may include components such as amplifiers, filters, mixers, matching circuits, an oscillator, an LO generator, a PLL, and digital to analog conversion circuitry. Each PA 254 receives and amplifies the corresponding output RF signal to provide a transmit RF signal having the proper output power level. The transmit RF signal is routed through the antenna interface circuit 224 and transmitted via the antenna(s) 210.

All or a portion of the transceiver 220 may be implemented on one or more analog integrated circuits (ICs), RF ICs (RFICs), mixed-signal ICs, etc. The RFIC may be included in a system in package (SiP) or module that also includes antennas 210, such as cavity-backed antennas. The data processor/controller 280 may perform various functions for the wireless device 110. For example, the data processor/controller 280 may perform processing for data being received via receiver 230 and for data being transmitted via transmitter 250. A memory 282 may store program codes and data for the data processor/controller 280. The data processor/controller 280 may be implemented on one or more application specific integrated circuits (ASICs) and/or other ICs. An example antenna array will now be discussed in more detail.

Example Cavity-Backed Dual-Polarized and Dual-Band Antenna Arrays

Figure 3:
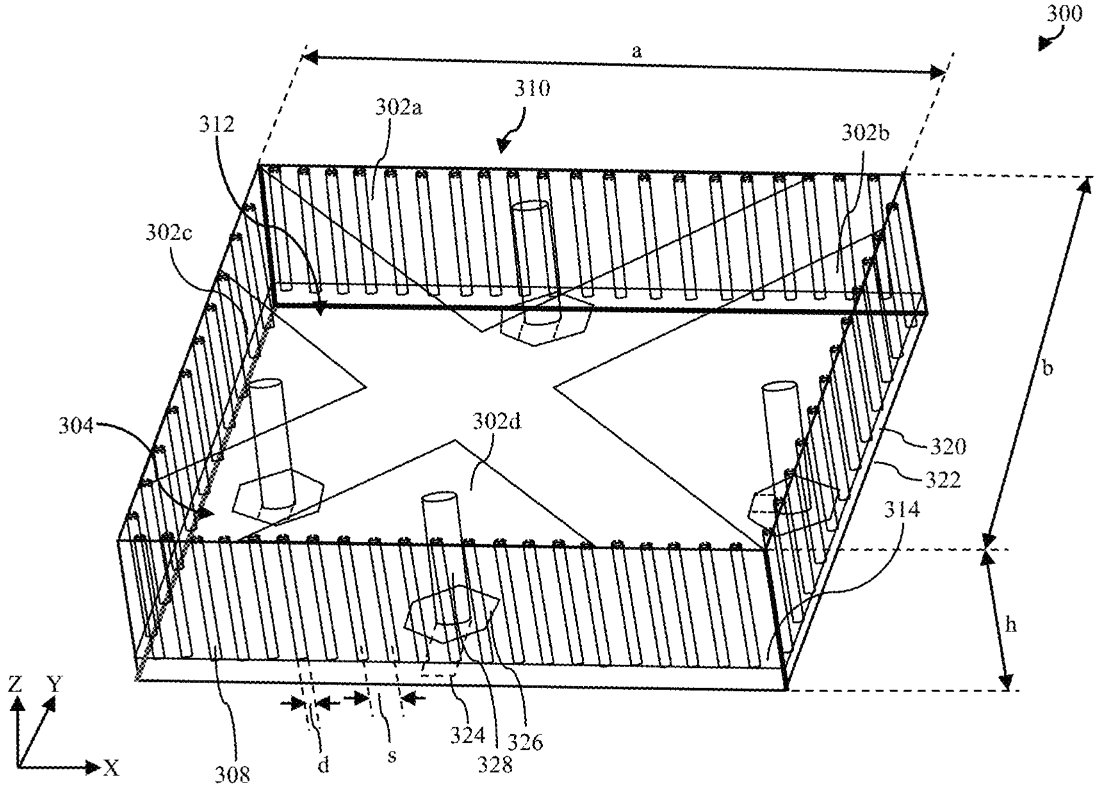
FIG. 3 is a perspective view of a dual-band antenna structure in which the resonators are triangular resonators in accordance with an aspect of the disclosure.
Figure 4:
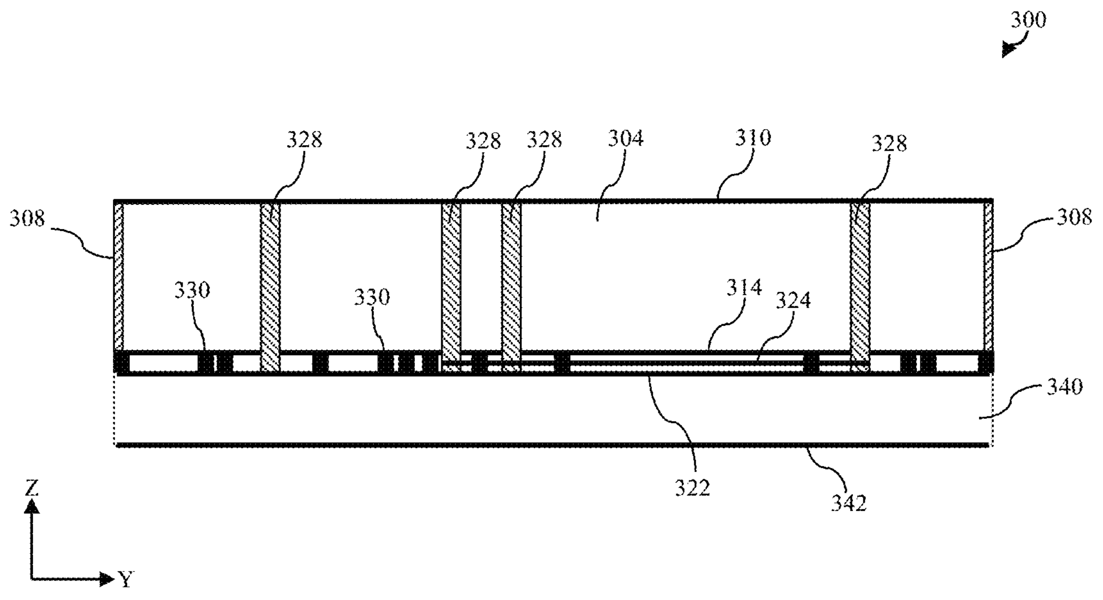
FIG. 4 is a cross-sectional view of the dual-band antenna structure of FIG. 3.
Figure 5:
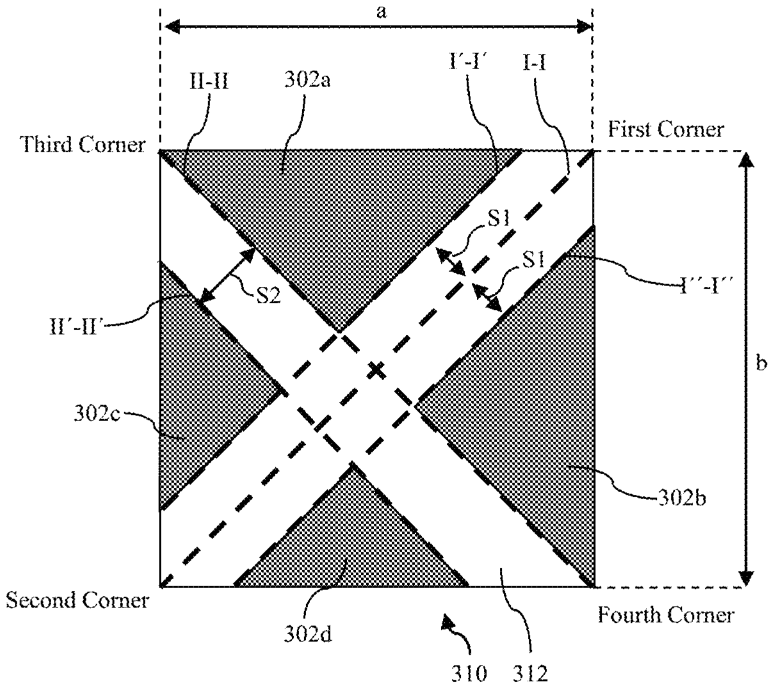
FIG. 5 is a plan view of the resonator layer of the dual-band antenna structure of FIG. 3.

A cavity-backed antenna assembly 300 with triangular resonators is shown in a perspective view in FIG. 3 and in a cross-sectional view in FIG. 4. A cavity 304 is enclosed by a ground layer 314, a rectangular via wall formed by a plurality of vias 308 and a resonator layer 310. Resonator layer 310 is divided by an X-shaped opening 312 into a pair of low-frequency triangular resonators 302*a* and 302*b* and into a pair of high-frequency triangular resonators 302*c* and 302*d*. Four linear rows of metal vias 308 surround a rectangular perimeter of cavity 304. A plan view of triangular resonators 302*a*, 302*b*, 302*c*, and 302*d* is shown in FIG. 5.

Due to the rectangular arrangement of vias 308, cavity 304 has a rectangular parallelepiped shape, which may also be denoted as a cuboid. Based upon the rectangular arrangement of vias 308, the cuboid formed by cavity 304 has a width a and a length b. A separation h between ground layer 314 and resonator layer 310 defines a height h of the cuboid.

Each via 308 has a diameter d. Adjacent vias 308 are separated by a pitch s that has a relationship to the diameter d to ensure minimum leakage of power through the sidewalls of the cavity 304. In some implementations, diameter d and pitch s of the metal vias 308 satisfy the following inequalities: $d<0.2\lambda$ and $d\geq 0.4s$, in which $\lambda$ is the wavelength of the electromagnetic (EM) mode in the cavity 304. Values that do not satisfy these inequalities may not allow a good confinement of the EM field, producing leaky waves outside the cavity 304. In some implementations, mechanical limitations may not allow the pitch to be less than 0.1 mm.

Cavity 304 may resonate in a transverse electric (TE) 101 mode. A TE mode means that there is a magnetic field component, but no electric field component in the direction of the EM wave propagation. The resonant frequency of the TE 101 mode (denoted as $F_{TE101}$) of the SIW cavity 304 can be expressed as $$F_{TE101} = \frac{C}{2\pi\sqrt{\varepsilon_r}}\sqrt{\left(\frac{m\pi}{a}\right)^2 + \left(\frac{n\pi}{h}\right)^2 + \left(\frac{k\pi}{b}\right)^2}$$

in which, m=1, n=0, k=1, a is the width of the SIW cavity 304, b is the length of the SIW cavity 304, h is the height of cavity 304, C is the velocity of light, and $\varepsilon_r$ represents permeability of a dielectric material filling cavity 304. In some implementations, the width a and the length b are different, such that a perimeter of cavity 304 has a rectangular shape. In other implementations, the width a and the length b are equal, such that the perimeter has a square shape.

For a dual-band SIW cavity-backed antenna design, the width a and the length b may be selected such that $F_{TE101}$ is an average of the higher and lower operating frequencies of the dual bands. For example, to provide a cavity for operation at $F_{TE101}$ equaling 28 GHz, some example parameters are a width a=4.37 mm (a=b), a permeability $\varepsilon_r$=4, and a height h=0.955 mm. Should a be shortened to 2.651 mm (a=b) with the same permeability and height, $F_{TE101}$ may be about 40 GHz. Thus, setting the width a to equal approximately 4 mm with the same permeability and height leads to a TE101 mode that may resonate at both 28 GHz and 40 GHz to provide a satisfactory dual-band performance.

Various feed structures such as stripline or microstrip may be used to propagate an RF signal to and from triangular resonators 302*a*, 302*b*, 302*c*, and 302*d*. In antenna assembly 300, a stripline is used to drive an RF signal to antenna assembly 300 (or to receive an RF signal). To form the stripline, a stripline ground layer 322 is positioned between ground layer 314 and a substrate 340. Substrate 340 may be a semiconductor substrate or a printed circuit board substrate. A stripline conductor metal layer 324 lies between ground layer 314 and stripline ground layer 322. Stripline conductor metal layer 324 is patterned as necessary to form the stripline leads to metallic (feed) probes 328 that extend from stripline metal layer 324 to couple to respective ones of resonators 302*a*, 302*b*, 302*c*, and 302*d*. As best seen in FIG. 3, ground layer 314 includes openings 326 for receiving probes 328 to prevent probes 328 from shorting to ground layer 314.

Stripline ground layer 322 may be disposed on a top surface of the substrate 340. To keep both the ground layer 314 and stripline ground layer 322 grounded, these metal layers may be coupled together by a plurality of metal shorting pins 330. The voltage potentials of the two metal layers 314 and 322 are thus both biased to ground. Some of the metal shorting pins 330 may be disposed directly under the metal vias 308. In alternative implementations, a microstrip or other suitable waveguide may be used as a feed structure for antenna assembly 300. The EM energy from the feed structure excites the dominant resonant TE 101 mode of the cavity 304 and further excites the metal resonators 302 as radiating elements of the antenna assembly 300.

Referring again to FIG. 4, a bottom surface of substrate 340 may be coated with another metal layer 342. The metal layer 342 may function as a ground plane. Should substrate 340 be a semiconductor substrate, it may be integrated with circuits such as for communication control and for the transceiver 220. Substrate 340 may be integrated into an RFIC chip, which may be electrically connected to feed structure such as stripline conductors to transmit or receive millimeter wave communication signals, or substrate 340 may be a carrier or other structure in a package.

Each probe 328 directly couples to a midpoint of a respective one of the triangular resonators 302*a*, 302*b*, 302*c*, and 302*d*. As best seen in FIG. 5, triangular resonators 302*c* and 302*d* each have the same size. Similarly, triangular resonators 302*a* and 302*b* each have the same size that is larger than the size of triangular resonators 302*c* and 302*d*. Triangular resonators 302*c* and 302*d* may thus be selected during operation at the higher band of the dual-band operation whereas triangular resonators 302*a* and 302*b* may be selected during operation at the lower band of the dual-band operation.

Given the different sizes of the resonators, X-shaped opening 312 has arms that are slightly asymmetric. For example, a first arm or slot has a middle longitudinal axis I-I that extends from a first corner of the square-shaped metal layer 310 to a diagonally opposite second corner. This first arm is bordered by edges I'-I' and I"-I" that are each spaced apart from axis I-I by a first spacing S1. A second arm or slot of the X-shaped opening 312 is bordered by a first edge II-II that extends from a third corner of the square shaped metal layer 310 to a diagonally opposite fourth corner. A second edge II'-II' of the second arm is spaced apart from edge II-II by a separation or spacing S2. In contrast to the first edge II-II, which extends between two corners, the second edge II'-II' extends between an X-axis side of the perimeter and a Y-axis side of the perimeter. The spacing S1 and/or S2 may vary based on the dimensions a and b in combination with a frequency of operation of the resonators 302 and a dielectric constant of the material filling cavity 304.

Longitudinal axis I-I of the first arm is orthogonal to first edge II-II of the second arm due to the square shape of resonator layer 310. Since edges I'-I' and I"-I" of the first arm are parallel to longitudinal axis I-I, first edge II-II of the second arm is also orthogonal to edges I'-I' and I"-I" of the first arm. Triangular resonators 302*a* and 302*b* are thus right triangles each having a hypotenuse aligned with a respective side or edge of metal layer 310. Similarly, since the second edge II'-II' of the second arm is parallel to its first edge II-II, second edge II'-II' is also orthogonal to edges I'-I' and I"-I" of the first arm. Triangular resonators 302*c* and 302*d* are thus right triangles each having a hypotenuse aligned with a respective side of the square shape of metal layer 310.

Note the resulting symmetry between triangular resonators for a given band. For example, a first end of the hypotenuse of triangular resonator 302*c* is separated from the third corner of the perimeter by the same distance that a first end of triangular resonator 302*d* is separated from the fourth corner of the perimeter. Similarly, a second end of the hypotenuse of triangular resonator 302*c* is separated from the second corner of the perimeter by the same distance that a second end of triangular resonator 302*d* is separated from the second corner. Triangular resonators 302*c* and 302*d* are thus orthogonally arranged with respect to a center of the square-shaped metal layer 310. Given this symmetrical and orthogonal relationship, triangular resonator 302*c* will transmit and receive according to a first linear polarization that is orthogonal to a second linear polarization for the triangular resonator 302*d*. A similar symmetry and orthogonal alignment are both present for triangular resonators 302*a* and 302*b*. Triangular resonator 302*b* will thus transmit and receive according to the first linear polarization whereas triangular resonator 302*a* will transmit and receive according to the second linear polarization.

The resulting antenna array or assembly 300 provides a number of advantages. Using just two metal layers (ground layer 314 and resonator layer 310) and the via wall formed by vias 308, not only is dual-band coverage achieved but so is dual-polarized coverage. By an appropriate phasing of the signaling to both resonators in a resonator pair, the orthogonal linear polarizations may combine to form a right-hand or left-hand circular polarization. Alternatively, just one of the resonators in a resonator pair may be active to achieve the desired linear polarization. In addition, the grounding of the metal vias 308, ground layer 314, and the hypotenuses of the triangular resonators 302*a*, 302*b*, 302*c*, and 302*d* reduces the interaction of antenna structure 300 with other objects as a user handles a mobile device including the antenna structure 300. Moreover, the fidelity of the linear polarizations is enhanced as compared to the use of traditional patch antennas. Furthermore, the radiation efficiency is enhanced as compared to the use of similar-sized traditional patch antennas. Since patch antenna radiation is based upon a fringing field, patch antenna radiation is typically distorted when incorporated into a mobile device. But this degradation is reduced or eliminated by antenna assembly 300.

Figure 6:
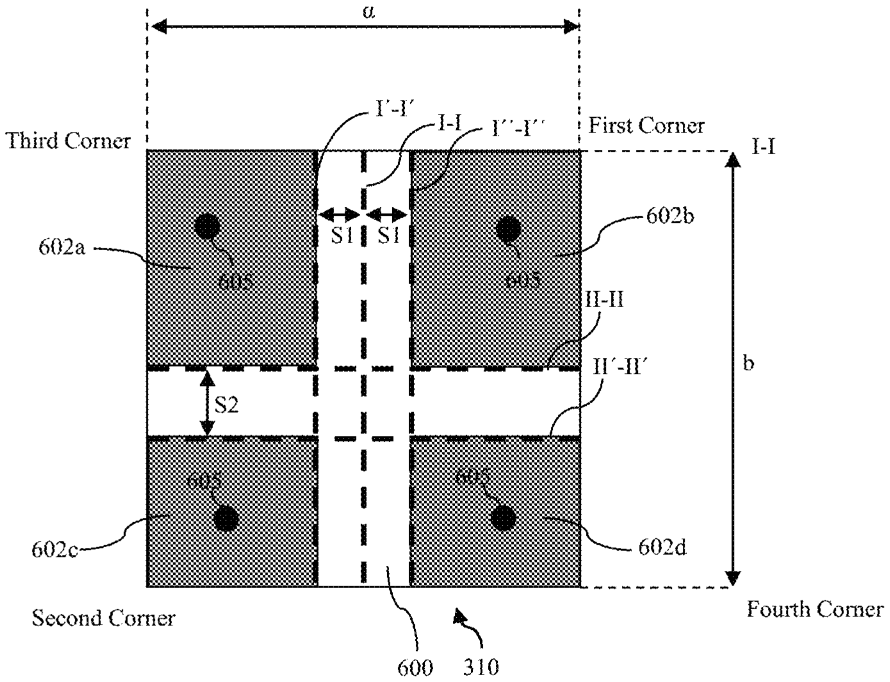
FIG. 6 is a plan view of the resonator layer in which the opening in the resonator metal layer is a cross-shaped opening in accordance with an aspect of the disclosure.

In an alternative implementation, resonator layer 310 is separated by a cross-shaped opening into two pairs of rectangular resonators. Analogous to the triangular resonators, the resonators in each pair of rectangular resonators are symmetric but for their orthogonal orientation with respect to a center of the resonator layer 310. An example cross-shaped opening 600 is shown in FIG. 6. Cross-shaped opening 600 divides metal layer 310 into four rectangular resonators 602*a*, 602*b*, 602*c*, and 602*d*. A first arm of the cross-shaped opening 600 has a central longitudinal axis I-I that extends from a midpoint of one side of resonator layer 310 to a midpoint of the opposing side. This first arm has a width of 2*S1, where S1 is a separation between axis I-I and a first edge I'-I' of the first arm. Similarly, S1 is also the separation between axis I-I and a second edge of the first arm I"-I".

In contrast to the first arm, a second arm of cross-shaped opening 600 cannot extend from a midpoint of a side of resonator layer 310 or the four rectangular resonators would all be the same size. Resonators 602*a* and 602*b* are the larger pair and are thus used for operation in the lower band of the dual-band coverage. Resonators 602*c* and 602*d* form the smaller pair that is used for operation in the higher band of the dual-band coverage. The second arm of the cross-shaped opening 600 is defined by its edges II-II and II'-II'. These edges are separated by a separation S2 (the width of the second arm).

Each rectangular resonator has a corner aligned with a corner of the perimeter of cavity 304. Within each resonator pair, these corners of the perimeter are adjacent to each other so that the resonator alignment with respect to a center of resonator layer 310 is orthogonal. For example, in the low-frequency resonator pair, resonator 602*a* has a corner aligned with a third corner of the rectangular perimeter whereas resonator 602*b* has a corner aligned with a first corner of the perimeter that is adjacent to the third corner. Similarly, resonator 602*c* in the high-frequency pair has a corner aligned with a second corner of the cavity perimeter whereas resonator 602*d* has a corner aligned with a fourth corner of the cavity perimeter that is adjacent to the second corner of the cavity perimeter.

As discussed for the triangular resonators, each rectangular resonator may be probe-fed by a corresponding probe 605 extending from a respective conductive lead through the cut-out region. A pair of probes 605 feeding the rectangular resonators 602*a* and 602*b* may carry signals at a lower operating frequency, such as at the 28 GHz band in some implementations. A pair of probes 605 feeding the rectangular resonators 602*c* and 602*d* may carry signals at a higher operating frequency, such as at the 40 GHz band in some implementations. Further, since the orientation from each rectangular resonator 602*a* and 602*b* from its respective probe 605 to a center of cross-shaped opening 600 is perpendicular to each other, one rectangular resonator may be horizontally polarized, and the other rectangular resonator may be vertically polarized. In other words, the rectangular resonators 602*a* and 602*b* form a dual-polarization system. By adjusting the phase difference between the signals fed by the probes (e.g., π/2 difference), the rectangular resonators 602*a* and 602*b* may provide a circular polarization at a lower operating frequency of the dual bands. Similarly, given the orthogonal alignment of the rectangular resonators 602*c* and 602*d*, one rectangular resonator may be horizontally polarized, and the other rectangular resonator may be vertically polarized. The rectangular resonators 602*c* and 602*d* thus form a dual-polarization system. By adjusting the phase difference between the signals fed by the probes (e.g., π/2 difference), the rectangular resonators 602*c* and 602*d* may support a circular polarized operation at the higher frequency band of the dual bands.

Figure 7:
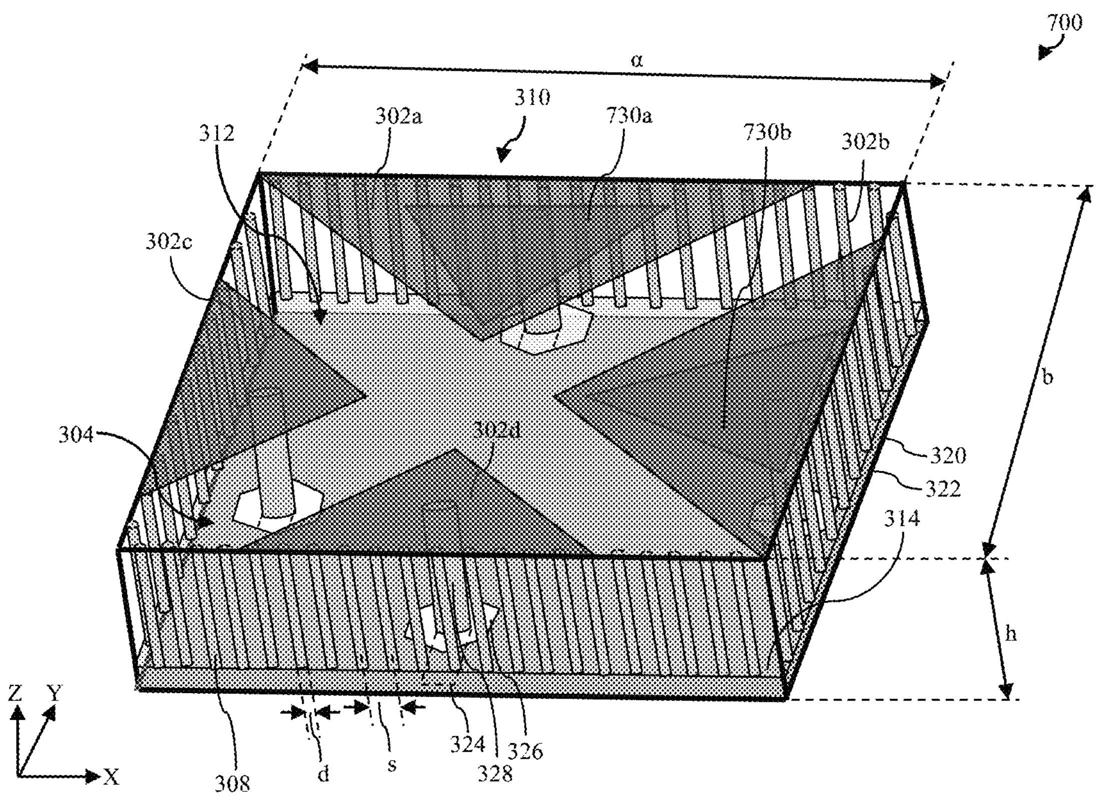
FIG. 7 is a perspective view of an alternative implementation of the dual-band antenna structure FIG. 3 in which the low-band resonators are capacitively coupled to the feed structure in accordance with an aspect of the disclosure.

Rather than directly couple to a resonator, a feed structure such as a probe 328 may capacitively couple to the corresponding resonator. Such a capacitive coupling may be used advantageously to increase bandwidth of the coupled resonator. In the following example, the low-band pair of resonators is capacitively coupled to their feed structure whereas the high-band pair of resonators is directly coupled to their feed structure. However, it will be appreciated that the high-band pair may also or alternatively be capacitively coupled in other implementations. An example antenna assembly 700 with a low-band capacitive feed is shown in FIG. 7. Structure 700 is as discussed with regard to antenna structure 300 except that the low-band triangular resonators 302*a* and 302*b* are excited by capacitive coupling. In that regard, the structure 700 may include two smaller triangular metal patches 730*a* and 730*b* each disposed beneath a respective one of the triangular resonators 302*a* and 302*b*. Triangular metal patches 730*a* and 730*b* may be formed through the patterning of an intermediate metal layer (not illustrated) that intervenes between ground layer 314 and resonator layer 310. The smaller metal patches 730*a* and 730*b* are probe-fed by respective ones of probes 328 and capacitively couple the EM energy to the corresponding ones of triangular resonators 302*a* and 302*b*. Accordingly, the two probes 328 feeding the metal patches 730*a* and 730*b* may be shorter in height than the other two probes 328 feeding the high-band triangular resonators 302*c* and 302*d*. Excitation by capacitive coupling may expand a bandwidth of the lower frequency band.

Figure 8:
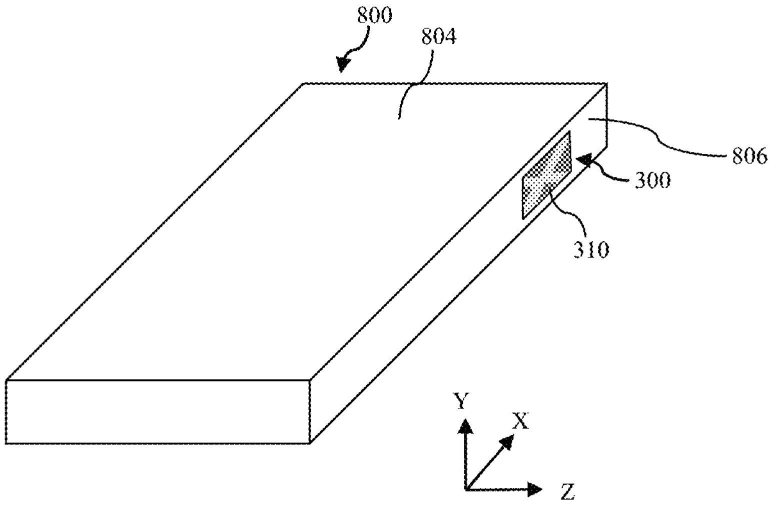
FIG. 8 illustrates a mobile wireless device including a cavity-backed antenna structure on an edge of the mobile wireless device in accordance with an aspect of the disclosure.

The integration of an antenna assembly into a mobile device will now be discussed. FIG. 8 shows an example of a handheld wireless device 800 having a substantially rectangular face 804. Wireless device 800 also has an opposing rectangular back face and four edges such as an edge 806. The antenna assemblies disclosed herein may be integrated into wireless device 800 such as for mmW communications. The compact size of the antenna assemblies disclosed herein allows their integration adjacent an inner surface of edge 806 of the wireless device 800. The resonator layer 310 (i.e., the radiation surface) of the antenna 300 including the four radiating elements may be flush or in close proximity with a surface of edge 806. It will be appreciated that antenna assembly 700 may be similarly integrated into wireless device 800.

Figure 9:
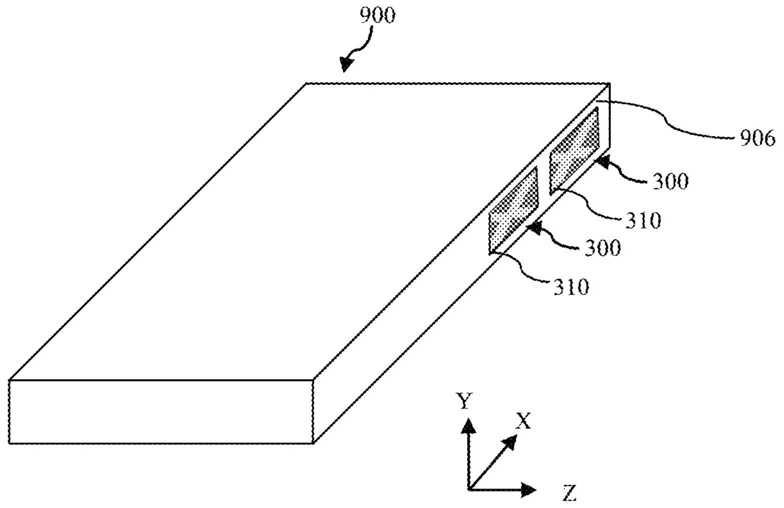
FIG. 9 illustrates a mobile wireless device including a pair of cavity-backed antenna structures on an edge of the mobile wireless device in accordance with an aspect of the disclosure.

In some implementations, multiple antenna assemblies may be integrated into the edge of a mobile device. For example, as shown in FIG. 9, a plurality of antenna assemblies 300 may be integrated adjacent an inner surface of the edge 906 of a wireless device 900 to form a dual-band dual-polarized antenna array. In wireless device 900, two antennas 300 are arranged in a row along the edge 906 of the handheld wireless communication device 900, but additional antennas may be included in the array, which may be a linear array or a two-dimensional array. Further, while the boresight of the antenna(s) 300 face out of the edge 806 or 906 (e.g., a side of the wireless device 800 or 900), the antenna(s) 300 may instead be arranged such that the boresight(s) face out of any surface of the wireless device 800 or 900.

The disclosure will now be summarized in the following example clauses.

Clause 1. An antenna assembly, comprising:
- a dielectric-filled cavity having a bottom surface, a top surface, and a rectangular perimeter;
- a first ground metal layer adjacent the bottom surface;
- a resonator metal layer adjacent the top surface;
- a plurality of metallic vias disposed along the rectangular perimeter and coupled to the first ground metal layer and to the resonator layer; and
- an opening configured to divide the resonator metal layer into a first triangular resonator having a first side aligned with a first side of the rectangular perimeter and into a second triangular resonator having a first side aligned with a second side of the rectangular perimeter.

Clause 2. The antenna assembly of clause 1, wherein the first side of the rectangular perimeter is adjacent the second side of the rectangular perimeter.

Clause 3. The antenna assembly of any of clauses 1-2, wherein the rectangular perimeter is a square perimeter.

Clause 4. The antenna assembly of clause 2, wherein the opening comprises an x-shaped opening including a first arm extending from a first corner of the rectangular perimeter to a diagonally opposing second corner of the rectangular perimeter.

Clause 5. The antenna of assembly of clause 4, wherein a second arm of the x-shaped opening extends from a third corner of the rectangular perimeter to a diagonally opposing fourth corner of the rectangular perimeter to further divide the resonator metal layer into a third triangular resonator having a first side aligned with a third side of the rectangular perimeter and into a fourth triangular resonator having a first side aligned with a fourth side of the rectangular perimeter.

Clause 6. The antenna of assembly of clause 5, wherein each of the first triangular resonator, the second triangular resonator, the third triangular resonator, and the fourth triangular resonator is a right triangular resonator in which the first side is a hypotenuse of the right triangular resonator.

Clause 7. The antenna assembly of clause 6, wherein the first triangular resonator and the third triangular resonator is each configured to radiate according to a first linear polarization, and wherein the second triangular resonator and the fourth triangular resonator is each configured to radiate according to a second linear polarization that is orthogonal to the first linear polarization.

Clause 8. The antenna assembly of clause 6, wherein a size of the first triangular resonator is equal to a size of the second triangular resonator and a size of the third triangular resonator is equal to a size of the fourth triangular resonator, and wherein the size of the first triangular resonator is less than the size of the third triangular resonator.

Clause 9. The antenna assembly of any of clauses 1-8, further comprising:

a second ground metal layer below the first ground metal layer;

a stripline metal layer intervening between the first ground metal layer and the second ground metal layer;

a first probe coupled to the first triangular resonator and extending through a first opening in the first ground metal layer to the stripline metal layer; and a second probe coupled to the first triangular resonator and extending through a second opening in the first ground metal layer to the stripline metal layer, wherein the stripline metal layer is configured into stripline conductors coupled to the first probe and the second probe.

Clause 10. The antenna assembly of clause 9, further comprising:

a substrate coupled to a bottom surface of the second ground metal layer.

Clause 11. The antenna assembly of clause 10, wherein the substrate is a semiconductor substrate.

Clause 12. The antenna assembly of clause 10, wherein the substrate is a circuit board substrate.

Clause 13. The antenna assembly of clause 9, wherein the first probe is capacitively coupled to the first triangular resonator and wherein the second probe is capacitively coupled to the second triangular resonator.

Clause 14. The antenna assembly of clause 9, wherein the first probe is directly coupled to the first triangular resonator and wherein the second probe is directly coupled to the second triangular resonator.

Clause 15. The antenna assembly of any of clauses 1-14, wherein the antenna assembly is in proximity to an edge of a cellular telephone such that a boresight of the antenna assembly faces out of the edge.

Clause 16. An antenna assembly, comprising:

a dielectric-filled cavity having a bottom surface, a top surface, and a rectangular perimeter;

a ground metal layer adjacent the bottom surface;

a resonator metal layer adjacent the top surface;

a plurality of metallic vias disposed along the rectangular perimeter and coupled to the ground metal layer and to the resonator layer; and an opening in the ground metal layer configured to divide the resonator metal layer into a first rectangular resonator having a first corner aligned with a first corner of the rectangular perimeter and into a second rectangular resonator having a second corner aligned with a second side of the rectangular perimeter.

Clause 17. The antenna assembly of claim 16, wherein the first corner of the rectangular perimeter is adjacent the second corner of the rectangular perimeter.

Clause 18. The antenna assembly of clause 16, wherein the rectangular perimeter is a square perimeter.

Clause 19. The antenna assembly of clause 16, wherein a size of the first rectangular resonator is equal to a size of the second rectangular resonator.

Clause 20. The antenna assembly of clause 18, wherein the opening a cross-shaped opening including a first arm extending from a midpoint of a first side of the rectangular perimeter to a midpoint of a second side of the rectangular perimeter, wherein the second side of the rectangular perimeter is an opposing side to the first side.

Clause 21. The antenna assembly of clause 20, wherein a second arm of the cross-shaped opening extends from a third side of the rectangular perimeter to an opposing fourth side of the rectangular perimeter to further divide the resonator metal layer into a third rectangular resonator having a first corner aligned with a third corner of the rectangular perimeter and into a fourth rectangular resonator having a first corner aligned with a fourth corner of the rectangular perimeter.

Clause 22. The antenna assembly of clause 21, wherein the first rectangular resonator and the third rectangular resonator is each configured to radiate according to a first linear polarization, and wherein the second rectangular resonator and the fourth rectangular resonator is each configured to radiate according to a second linear polarization that is orthogonal to the first linear polarization.

Clause 23. The antenna assembly of clause 21, wherein a size of the first rectangular resonator is equal to a size of the second rectangular resonator and a size of the third rectangular resonator is equal to a size of the fourth rectangular resonator, and wherein the size of the first rectangular resonator is less than the size of the third rectangular resonator.

Clause 24. An apparatus for wireless communication, comprising:

a substrate integrated waveguide (SIW) cavity;

first, second, third, and fourth metal resonators disposed on a top surface of the SIW cavity, wherein the first and second metal resonators are operable to radiate at a first millimeter wave frequency and the third and fourth metal resonators are operable to radiate at a second millimeter wave frequency that is higher than the first millimeter wave frequency;

a ground layer disposed on a bottom surface of the SIW cavity;

a substrate coupled to a bottom surface of the ground layer; and a conductive lead disposed between the ground layer and the substrate, wherein the conductive lead is operable to feed electromagnetic (EM) energy into the SIW cavity through an opening in the ground layer.

Clause 25. The apparatus of clause 24, wherein each of the first, second, third, and fourth metal patches is excited by a probe feed coupled to the conductive lead.

Clause 26. A mobile wireless device, comprising:

an external housing having a rectangular front face, an opposing rectangular back face, and four edges;

a substrate supporting an antenna and having a top surface facing one of the four edges of the external housing, wherein the antenna includes:

a dielectric-filled cavity;

a ground metal layer adjacent a lower surface of the dielectric-filled cavity;

a resonator metal layer adjacent an upper surface of the dielectric-filled cavity, and a plurality of metallic vias arranged around a rectangular perimeter of the dielectric-filled cavity, wherein the resonator metal layer is divided by an opening into a pair of triangular resonators of a first size and into a pair of second triangular resonators of a second size that is smaller than the first size.

Clause 27. The mobile wireless device of clause 26, wherein the rectangular perimeter is a square perimeter.

Clause 28. The mobile wireless device of clause 26, wherein each triangular resonator is a right triangular resonator.

Clause 29. The mobile wireless device of clause 28, wherein each right triangular resonator has a hypotenuse aligned with a side of the rectangular perimeter of the dielectric-filled cavity.

Clause 30. The mobile wireless device of clause 29, wherein the plurality of metallic vias is configured to ground the hypotenuse of each right triangular resonator.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An antenna assembly, comprising:

a dielectric-filled cavity having a bottom surface, a top surface, and a rectangular perimeter having a first side that extends from a first corner to a fourth corner, a second side that extends from the fourth corner to a second corner, a third side that extends from the second corner to a third corner, and a fourth side that extends from the third corner to the first corner, and wherein the first corner is opposite to the second corner and the third corner is opposite to the fourth corner;

a first ground metal layer adjacent the bottom surface;

a resonator metal layer adjacent the top surface;

a plurality of metallic vias disposed along the rectangular perimeter and coupled to the first ground metal layer and to the resonator metal layer; and an asymmetric x-shaped opening dividing the resonator metal layer into a first right-angled triangular resonator, a second right-angled triangular resonator, a third right-angled triangular resonator, and a fourth right-angled triangular resonator, wherein the first right-angled triangular resonator and the second triangular right-angled resonator are each of a first size that is greater than a second size of each of the third right-angled triangular resonator and the fourth right-angled triangular resonator, and wherein a hypotenuse of the first right-angled triangular extends along the fourth side from a first end aligned with the third corner to a second end that is spaced apart from the first corner by a first distance, and wherein a hypotenuse of the second right-angled triangular resonator extends along the first side from a first end aligned with the fourth corner to a second end that is spaced apart from the first corner by the first distance.

2. The antenna assembly of claim 1, wherein a hypotenuse of the third right-angled triangular resonator extends along the second side from a first end spaced apart from the second corner by the first distance to a second end spaced apart from the fourth corner by a second distance that is greater than the first distance, and wherein a hypotenuse of the fourth right-angled triangular resonator extends along the third side from a first end spaced apart from the second corner by the first distance to a second end spaced apart from the third corner by the second distance.

3. The antenna assembly of claim 1, wherein the rectangular perimeter is a square perimeter.

4. The antenna assembly of claim 1, wherein the first triangular resonator and the third triangular resonator are each configured to radiate according to a first linear polarization, and wherein the second triangular resonator and the fourth triangular resonator are each configured to radiate according to a second linear polarization that is orthogonal to the first linear polarization.

5. The antenna assembly of claim 1, further comprising:

a second ground metal layer below the first ground metal layer;

a stripline metal layer intervening between the first ground metal layer and the second ground metal layer;

a first probe coupled to the first right-angled triangular resonator and extending through a first opening in the first ground metal layer to the stripline metal layer; and a second probe coupled to the second right-angled triangular resonator and extending through a second opening in the first ground metal layer to the stripline metal layer, wherein the stripline metal layer is configured into stripline conductors coupled to the first probe and the second probe.

6. The antenna assembly of claim 5, further comprising:

a substrate coupled to a bottom surface of the second ground metal layer.

7. The antenna assembly of claim 6, wherein the substrate is a semiconductor substrate.

8. The antenna assembly of claim 6, wherein the substrate is a circuit board substrate.

9. The antenna assembly of claim 5, wherein the first probe is capacitively coupled to the first right-angled triangular resonator and wherein the second probe is capacitively coupled to the second right-angled triangular resonator.

10. The antenna assembly of claim 5, wherein the first probe is directly coupled to the first right-angled triangular resonator and wherein the second probe is directly coupled to the second right-angled triangular resonator.

11. The antenna assembly of claim 1, wherein the antenna assembly is in proximity to an edge of a cellular telephone such that a boresight of the antenna assembly faces out of the edge.

* * * * *